Nov. 12, 1935.  A. F. STUEBING  2,020,481
FRICTION DRAFT GEAR
Filed Jan. 24, 1931  2 Sheets-Sheet 2
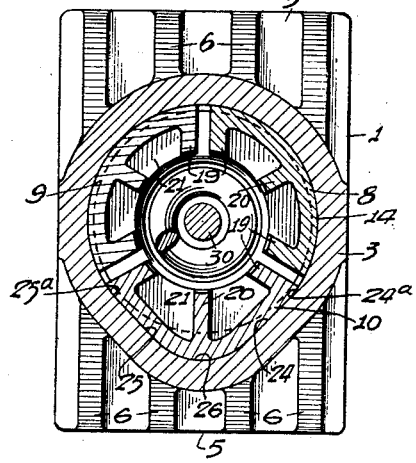
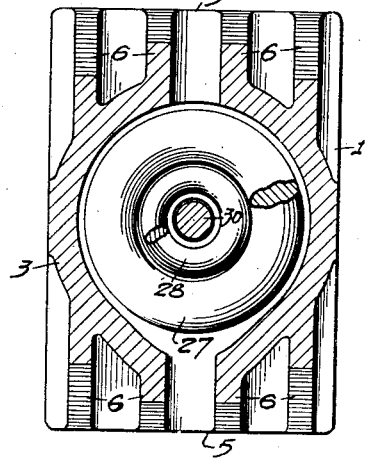
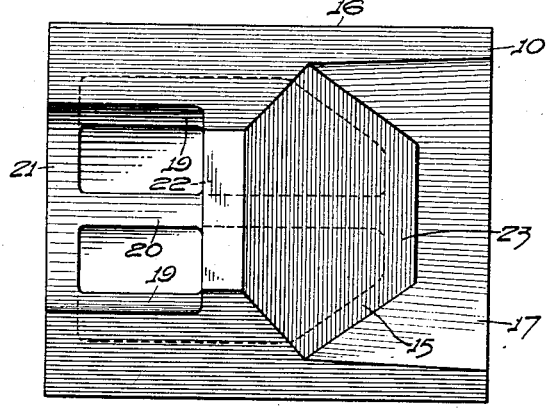
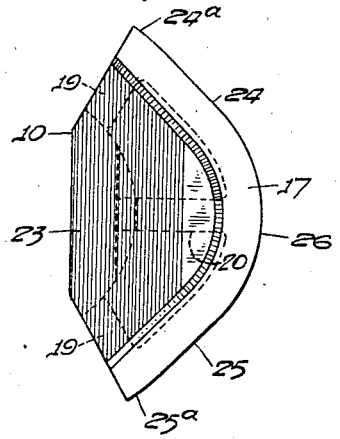
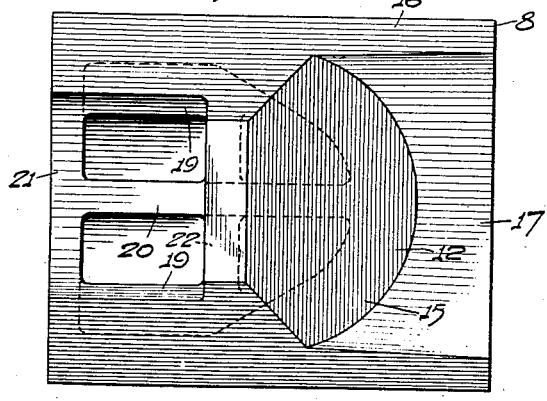
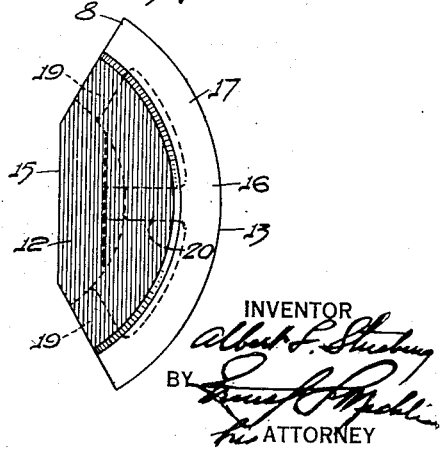
INVENTOR
Albert F. Stuebing
BY
ATTORNEY Patented Nov. 12, 1935

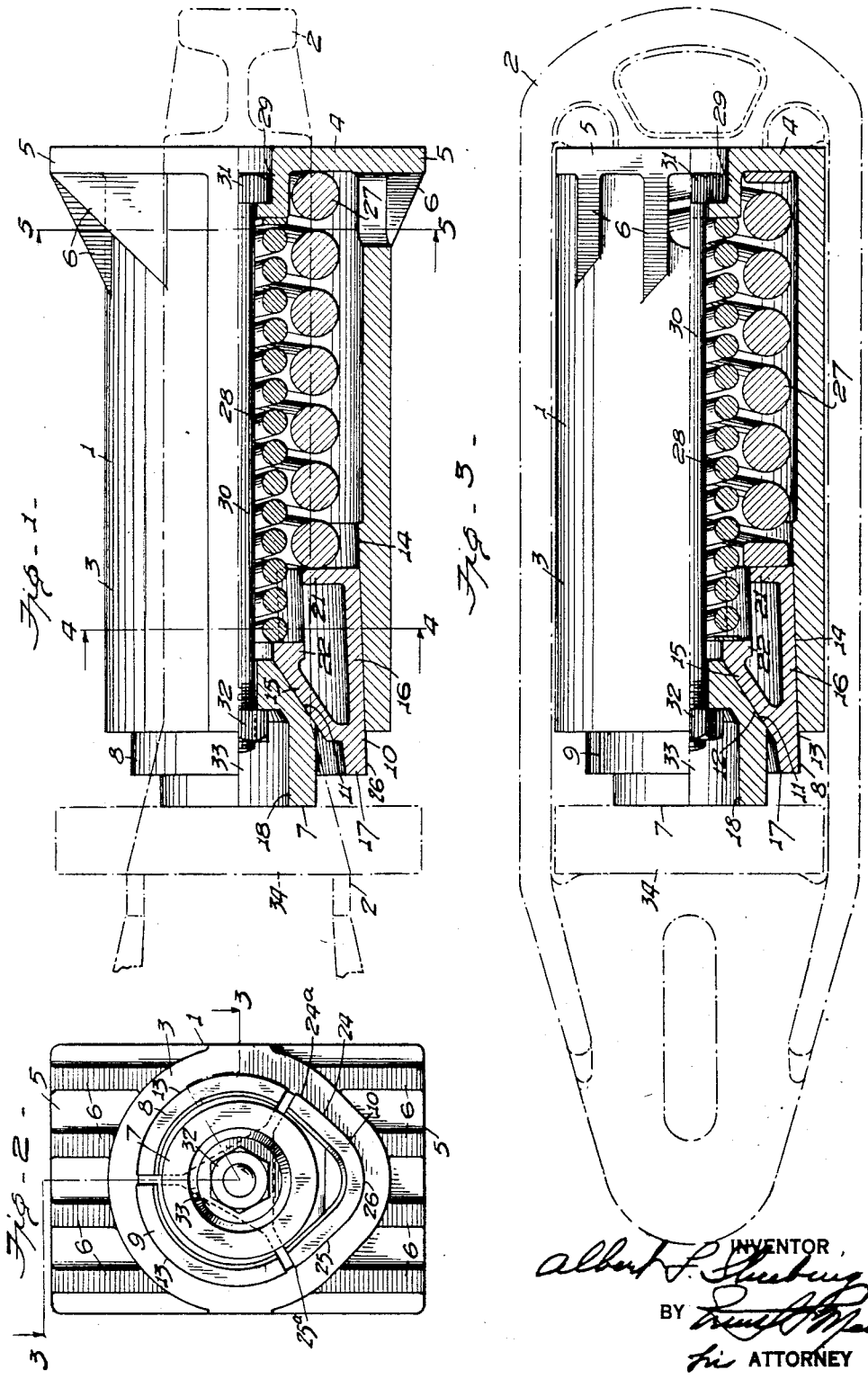

2,020,481

UNITED STATES PATENT OFFICE 2,020,481

FRICTION DRAFT GEAR

Albert F. Stuebing, New York, N. Y.

Application January 24, 1931, Serial No. 511,023

6 Claims. (Cl. 213—32)

My invention relates to friction draft gears for railway cars and it has for its principal object the provision of improved means for facilitating the return of the friction elements thereof to their normal positions after operation of the gear.

A primary feature of the invention consists in providing a draft gear with a plurality of friction elements, one of which is provided with curved and plane surfaces in frictional engagement with the load sustaining member of the gear.

Another feature of the invention consists in providing a draft gear having a load sustaining column member with a plurality of friction elements one of which is provided with a curved surface in frictional engagement with the column member and another of which is provided with angularly disposed plane surfaces also in frictional engagement with the column member.

A further feature of the invention consists in providing a draft gear having a load sustaining column member with a plurality of friction elements one of which is provided with two plane surfaces connected by a curved surface respectively in frictional engagement with the column member.

A still further feature of the invention consists in providing a draft gear having a load sustaining column member with a plurality of friction elements one of which is provided with a curved friction surface and another one of which is provided with substantially normal plane friction surfaces connected by a curved friction surface.

Other and more specific features of the invention residing in advantageous forms, combinations and relations of parts will hereinafter appear and be pointed out in the claims.

In the drawings illustrating a preferred embodiment of the invention:

Figure 1 is a view partly in section and partly in plan of the draft gear.

Figure 2 is an end elevational view of the gear.

Figure 3 is a view partly in section and partly in elevation taken on line 3—3 of Figure 2.

Figures 4 and 5 are vertical sectional views taken on lines 4—4 and 5—5 of Figure 1.

Figure 6 is an enlarged inside side elevational view of one of the friction elements of the gear.

Figure 7 is an end elevational view of the friction element of Figure 6 as seen from the right hand side of that figure.

Figure 8 is an enlarged inside side elevational view of another of the friction elements.

Figure 9 is an end elevational view of the friction element of Figure 8 as seen from the right hand side of that figure.

Referring more particularly to the drawings 1 indicates a load sustaining column member of a draft gear which is adapted to cooperate with a yoke, diagrammatically illustrated at 2. The column member is preferably in the form of a housing and is provided with a hollow body portion 3 closed at its inner end by a wall 4. If desired the housing may be conveniently formed adjacent its inner end with laterally projecting portions 5 adapted to cooperate wtih suitable stops 10 (not shown) to prevent inward movement of the housing with respect to the car. These portions may be conveniently rigidified with a plurality of reinforcing ribs 6.

The friction elements of the gear are disposed within the forward portion of the housing and comprise a central wedge member 7 and a plurality of shoes, preferably three in number, designated by the reference numerals 8, 9 and 10. The central wedge member, is formed with three angularly disposed wedging similarly formed surfaces 11 for respectively cooperating with the three shoes.

The shoes designated by the reference numerals 8 and 9 are identical and each is formed with opposed inner and outer friction surfaces 12 and 13, respectively. The inner friction surface 12 of each of these shoes is adapted to be disposed in a plane substantially parallel with the adjacent surface 11 of the wedge member for cooperating therewith. The outer friction surface 13 of each of shoes 8 and 9 is cylindrically curved and is adapted to cooperate with similarly formed friction surfaces 14 on the interior of the forward portion of the body portion 3 of the housing. The friction shoes may advantageously be formed of cast metal and provided with plate-like portions 15 and 16 on the outer sides of which the surfaces 12 and 13 are respectively formed. Adjacent their outer ends the plate-like portions intersect and continue as an outwardly extending lip or lug 17 normally disposed in spaced overlapping relation with a cylindrical portion 18 of the wedge. The plate-like portions are connected by side walls 19 and an intermediate web or flange 20 and, for a purpose to be hereinafter described, the inner end of the plate portions are respectively formed with inwardly projecting flanges 21 and 22.

The other shoe 10 is formed on its inner side with a wedging surface 23 cooperable with the adjacent surface of the wedge member while on its outer side it is formed with three surfaces 24, 25 and 26 which together form one continuous surface. The major portions of surfaces 24 and 55

25 are plane surfaces and are preferably disposed substantially normal to each other while surface 26 which connects 24 and 25 is cylindrically curved, the axis of curvature thereof being less than the axis of curvature of surfaces 13 of shoes 8 and 9. To prevent the forces transmitted from the housing to the shoe from concentrating in the portions of the housing immediately adjacent the side edges of the shoes, surfaces 24 and 25 may advantageously be curved as indicated at 24ª and 25ª respectively. The interior of the forward end of the housing is formed with plane and curved portions for respectively cooperating with the correspondingly formed surfaces of the exterior of shoe 10. Since shoe 10 is of the same construction as shoes 8 and 9, with the exception of the contour of its outer surface, corresponding parts of the shoes are designated by similar reference numerals.
Disposed within the housing are a plurality of springs 27 and 28 for returning the friction elements to the positions illustrated in Figures 1 and 2, after the gear has been operated in either buff or draft. The spring 27 cooperates with the end wall 4 of the housing and the flanges 21 of the shoes while the spring 28 engages the flanges 22 of the shoes and any suitable portion of the end wall such as an inwardly projecting boss 29. The friction elements are preferably retained in assembled position by a longitudinally extending bolt 30 on one end of which is a head 31 which may be conveniently disposed within the boss 29 and on the other end of which is a removable nut 32 disposed within a recess 33 in the cylindrical portion 18 of the wedge.

In the operation of the gear the central wedge member may be actuated by a follower diagrammatically shown at 34. If the gear is operated by buffing forces, the follower is moved toward the housing by a coupler or other suitable means (not shown), the gear housing being held stationary in the manner heretofore described, while if the gear is operated by draft forces the housing is moved toward the follower by the yoke, the follower being held stationary by suitable stops (not shown). In either event the force applied to the wedge is transmitted to the friction shoes through the cooperating wedge surfaces setting up lateral forces which press the shoes against the friction surfaces of the housing and forces tending to move the shoes inwardly with respect to the latter. The inward movement of the shoes is resisted by the springs 27 and 28 and also by the frictional forces between the shoes and housing. To increase the frictional forces between the various elements of the gear, the cooperating friction surfaces of the shoes and housing taper or converge inwardly thereby causing movement of the shoes relative to the central wedge when the latter is actuated.

Although the wedge exerts equal forces on the shoes the magnitude set up in the housing opposing those forces depends upon the relationship between the wedging faces and the friction faces because in any system of forces the magnitude of the opposing force depends upon the angle the resultant of that force makes with the applied force. Upon referring to shoes 8 and 9 it will be observed that since the cooperating surfaces of these shoes and the housing are curved, the forces normal to the surfaces set up in the housing opposing the lateral forces exerted by the wedge on the shoes will act toward the axes of curvature of the surfaces. Thus the forces opposing lateral movement of shoes 8 and 9 are disposed at angles to the force applied by the wedge to the shoes and the former are, therefore, greater than the latter. Upon referring to shoe 10, it will be observed that the force set up in the housing opposing the lateral forces exerted by the wedge on the shoe act normal to the plane friction surfaces 24 and 25 and radial to the curved surface 22. Thus the forces opposing lateral movement of shoe 10 are also disposed at angles to the forces applied by the wedge to the shoe and the former are greater than the latter. However, due to the fact that shoe 10 has a greater number of transverse increments of surface on its outer face forming a greater angle to the force transmitted thereto by the wedge than shoes 8 and 9 have with respect to the forces transmitted to them by the wedge, the summation of the forces set up in the housing opposing lateral movement of shoe 10 are of greater magnitude than the summation of the forces set up in the housing opposing lateral movement of shoes 8 and 9. Shoe 10, therefore, has a greater frictional resistance to movement than shoes 8 and 9. This difference in frictional resistance will have comparatively little effect during closure of the gear except to produce a tendency for shoes 8 and 9 to travel a greater distance than shoe 10, thereby causing the spring to exert a greater force on each of shoes 8 and 9 than on shoe 10, but when the compressive force applied to the gear is removed, shoes 8 and 9, since they have less frictional resistance to movement than shoe 10, will tend to release in advance of shoe 10, thereby releasing the pressure between wedge 11 and shoe 10 and effecting quick release of the gear.

The structure disclosed in this application produces a combination of several desirable conditions. The contours of the friction elements are substantially tangent to the same circle at their adjacent edges, thereby minimizing bending stresses in the housing. The shoe having the plane surfaces is so formed that the plane surfaces lie without the circle passing through the outer edges of the sides of the three shoes which lie adjacent to each other, so that the diameter, and therefore the capacity, of the spring are not reduced by the use of the plane surfaces. Furthermore the wedge 11 exerts equal forces on the three shoes 8, 9 and 10 and the frictional area of shoe 10 varies but little from the area of shoes 8 and 9.

It is to be noted that the plane friction surfaces of shoe 10 prevent the shoes from rotating about the axis of the gear, the tendency toward rotation being caused by movement of the coil springs in closing and release of the gear. However, the shoes 8 and 9 may rotate slightly due to the clearance between them and the shoe 10 so as to compensate for deviation from parallelism of their plane wedging faces.

From the foregoing it will be appreciated that the construction of the gear is such that the return of the friction elements to their normal position after closure of the gear is greatly facilitated.

I claim:
1. A draft gear for railway cars involving a load sustaining column member; wedging means;
and a plurality of friction elements respectively having faces inclined in the same direction with respect to the longitudinal axis of the gear for cooperating with said wedging means, said friction elements being movable relatively to said column member and being respectively provided with friction surfaces in engagement with the latter, and forming equal angles with the wedging faces, one of said elements having plane friction surfaces and the other of said elements having cylindrical friction surfaces, said surfaces being so arranged that the summation of the friction producing forces between the column member and the element having the plane surfaces is greater than the summation of the friction producing forces between the column member and the other of said elements.

2. A draft gear for railway cars involving a load sustaining column member; a plurality of friction elements cooperable therewith and movable relatively thereto; means for moving the shoes longitudinally and exerting equal lateral forces thereon; and spring means opposing movement of said elements, one of said elements having a curved friction surface and another of said elements having plane and curved friction surfaces, each of said friction surfaces being in engagement with the column member, the summation of the friction producing forces between the column member and the element having the plane and curved surfaces being greater than the summation of the friction producing forces between the column member and the element having only the curved surface.

3. A draft gear for railway cars involving a housing having friction surfaces; a central wedge member, disposed within the housing, and having wedging faces inclined in the same direction along the longitudinal axis of the gear; a plurality of movable friction elements operatively interposed between the wedge and housing, having faces in engagement with said wedging faces of the wedge member and forming equal angles with the friction surfaces of the housing; and spring means opposing movement of said elements, one of said elements having plane and cylindrical friction surfaces, and the other of said elements having only cylindrical friction surfaces, each of said surfaces being in frictional engagement with the housing, the summation of the friction producing forces between the housing and the element having the plane and cylindrical surfaces being greater than between the column member and the element having only cylindrical friction surfaces.

4. A draft gear for railway cars involving a housing; a central wedge member disposed within the housing and having wedging faces inclined in the same direction along the longitudinal axis of the gear; a plurality of movable friction elements operatively interposed between the wedge and housing and having faces in engagement with said wedging faces of the wedge member; and spring means opposing movement of said elements, one of said elements having two plane surfaces connected by a curved surface, and the other of said elements having two cylindrical surfaces, each of said surfaces being in frictional engagement with the housing.

5. A draft gear for railway cars involving a load sustaining column member, a plurality of friction elements movable relatively to the column member; wedging means having faces inclined in the same direction along the axis of the gear and exerting substantially equal forces on all of said friction elements; and spring means opposing movement of said elements, at least one of said elements having a curved friction surface and another of said elements having two substantially plane friction surfaces connected by a curved friction surface, each of said friction surfaces being in engagement with the column member.

6. A draft gear for railway cars involving a load-sustaining column member; friction elements, a plurality of said elements being provided with substantially coaxial cylindrical friction surfaces; and another element having plane friction surfaces; a wedging element having wedging faces extending in the same direction along the axis of the gear and exerting substantially equal forces on all said friction elements; and spring means opposing movement of said elements; the summation of the friction producing forces between the column member and the friction elements having the cylindrical friction surfaces being greater than between the column member and the friction elements having the plane friction surfaces.

ALBERT F. STUEBING.